(12) United States Patent
Chabot et al.

(10) Patent No.: US 7,304,187 B2
(45) Date of Patent: Dec. 4, 2007

(54) PROCESS FOR REDUCING THE FORMALDEHYDE CONTENT OF A GAS

(75) Inventors: Stéphane Chabot, Lévis (CA); Martin Beaulieu, Ste-Foy (CA); Yves Charest, Ancienne-Lorette (CA); Dominique Le Bel, Repentigny (CA)

(73) Assignee: Groupe Conseil ProCD Inc., Québec (CA)

( * ) Notice: Subject to any disclaimer, the term of this patent is extended or adjusted under 35 U.S.C. 154(b) by 104 days.

(21) Appl. No.: 11/245,185

(22) Filed: Oct. 7, 2005

(65) Prior Publication Data

US 2007/0081933 A1   Apr. 12, 2007

(51) Int. Cl.
*C07C 45/85* (2006.01)
*C07C 51/10* (2006.01)
*A01N 59/16* (2006.01)

(52) U.S. Cl. .................. 568/493; 562/518; 424/618
(58) Field of Classification Search ............. None
See application file for complete search history.

(56) References Cited

U.S. PATENT DOCUMENTS

| | | | |
|---|---|---|---|
| 4,002,722 A | 1/1977 | Suzuki et al. |
| 4,104,162 A | 8/1978 | Junkermann et al. |
| 4,319,055 A | 3/1982 | Rebakfa et al. |
| 4,880,609 A | 11/1989 | Naraghi |
| 5,207,877 A | 5/1993 | Weinberg et al. |
| 5,364,599 A | 11/1994 | Lee |
| 5,907,066 A | 5/1999 | Wachs |
| 6,207,120 B1 | 3/2001 | Belmonte et al. |
| 6,277,344 B1 | 8/2001 | Hei et al. |
| 6,384,184 B1 | 5/2002 | Ruesse |
| 6,391,099 B1 | 5/2002 | Ina et al. |
| 6,406,616 B1 | 6/2002 | Rappas et al. |
| 6,410,793 B1 | 6/2002 | Wachs |
| 6,518,477 B2 | 2/2003 | Soundararajan |
| 6,531,634 B1 | 3/2003 | Zhu |
| 6,541,038 B1 * | 4/2003 | Tanaka et al. ............ 424/618 |
| 6,770,174 B1 | 8/2004 | Richards et al. |
| 6,774,277 B2 | 8/2004 | Fisher |
| 6,930,072 B2 | 8/2005 | Wachs et al. |
| 2005/0139554 A1 | 6/2005 | Clark |
| 2005/0187124 A1 | 8/2005 | Li et al. |

FOREIGN PATENT DOCUMENTS

| | | |
|---|---|---|
| EP | 1 206 960 | 5/2002 |
| WO | 99/36160 A1 | 7/1999 |
| WO | 2004/030797 A1 | 4/2004 |

OTHER PUBLICATIONS

English Abstract of JP55056820, published on Apr. 26, 1980.
English Abstract of DE 197 53 117, published on Jun. 18, 1998.
English language abstract of CN1524604, published Sep. 1, 2004.
English language abstract of JP5228333, published Sep. 7, 1993.
English language abstract of JP52000217, published Jan. 5, 1977.
English language abstract of JP62171798, published Jul. 28, 1987.
English language abstract of JP6142440, published May 24, 1994.
English language abstract of DE3221795, published Dec. 15, 1983.

* cited by examiner

*Primary Examiner*—Sikarl A. Witherspoon
(74) *Attorney, Agent, or Firm*—Bereskin & Parr

(57) ABSTRACT

There is provided a process for reducing formaldehyde content of a gas comprising the step of contacting the gas with an aqueous oxidizing solution comprising at least one cation, a base, and $H_2O_2$ so as to oxidize at least a part of the formaldehyde contained in the gas into formic acid. Thus, a gas having a reduced content in formaldehyde as compared to the gas before the process and a solution comprising formic acid, are so-obtained. Such a process can be particularly useful for treating various types of gases containing formaldehyde.

43 Claims, 3 Drawing Sheets

PROCESS FOR REDUCING THE FORMALDEHYDE CONTENT OF A GAS

TECHNICAL FIELD

The present invention relates to improvements in the field of gas treatment so as to reduce their pollutants and/or impurities content. In particular, this invention relates to a process for reducing the formaldehyde content of a gas. This process can be particularly useful for reducing the formaldehyde content of various gases such as industrial waste gases or gases comprising formaldehyde together with other impurities. The invention also relates to an aqueous oxidizing solution suitable for oxidizing formaldehyde.

BACKGROUND OF THE INVENTION

It is nowadays a major concern to considerably reduce the emission of various pollutants in the environment. Formaldehyde is one of the products that several industries must treat so as to avoid releasing it into the atmosphere. In particular, such gases may be generated in the wood or pulp and paper industries, as example wood-based panel products such as oriented strandboards (OSB), or fiberboards such as low density fiberboards (LDF), medium density fiberboards (MDF) or high density fiberboards (HDF) and particle boards. In various other types of industries formaldehyde emissions are encountered. Such industries include foundries, smelters, petrochemical industries, sugar industries, dental care products industries, polymer industries, automotive industries, paint industries, glassware industries, mineral wool industries. Often gases comprising formaldehyde are treated so as to be oxidized it into $CO_2$, which causes green house effect.

Among the technologies proposed so far there is RTO (Regenerative Thermal Oxidizer). However, it has been demonstrated that such a technology can be very costly to install in a plant, and high maintenance fees may be required to operate it. Moreover, such a technology can generate important amounts of smog precursors, which is undesirable from an environmental point of view. RTO relies on thermal oxidization to destroy these emissions. As example, in the wood-based panel industry, dryer or press gases are sent to the RTO where the VOCs (Volatile Organic Compounds), such as formaldehyde, methanol, ethanol as well as pinenes, limonenes, camphene, ketones, are incinerated at very high temperatures of about 800° C. To increase the thermal efficiency of the system, ceramic beds are used to preheat the inlet air prior to combustion. This technology can be effective in the destruction of VOCs, CO and organic particulate. However, RTOs do generate some NOx (smog precursors) and green house gases (GHG) from the combustion of natural gas and other fossil fuels to generate the required temperatures. RTOs are fairly expensive to operate and require a source of fossil fuel. Moreover, inorganic particulate may cause bed fouling. RTOs operate at or close to the melting point of some of these inorganic particulate and once melted, these by-products can permanently adhere to the ceramic bed and cause premature bed failure. Occasional bed burn-out is required to clear the bed of organic particulate and reduce pressure drops. Additional inorganic particulate devices may be required upstream of the RTO.

Bio-filtration is a recent technology used for the capture and destruction of particulate and VOCs. Some mesophilic micro-organisms can be well suited for the destruction of easily degradable VOCs. However, such a technology requires high installation costs and a large surface area. It also requires very stable operating conditions.

It would thus be highly desirable to be provided with a process that would overcome the above-mentioned drawbacks.

SUMMARY OF THE INVENTION

It is therefore an object of the present invention to provide a process that would overcome the above-mentioned drawbacks.

It is another object of the present invention to provide a process for reducing the formaldehyde content of a gas in an environment friendly manner.

It is another object of the present invention to provide a process for reducing the formaldehyde content of a gas in a simple manner.

It is another object of the present invention to provide a process for reducing the formaldehyde content of a gas, which could be operated at low costs.

It is another object of the present invention to provide a process for reducing the formaldehyde content of a gas without generating considerable amounts of smog precursors such as NOx, SOx etc.

It is another object of the present invention to provide an oxidizing solution that is useful for efficiently reducing the formaldehyde content of a gas.

According to one aspect of the invention, there is provided a process for reducing formaldehyde content of a gas comprising the step of contacting the gas with an aqueous oxidizing solution comprising at least one cation, a base, and $H_2O_2$ so as to oxidize at least a part of the formaldehyde contained in the gas into formic acid, thereby obtaining a gas having a reduced content in formaldehyde as compared to the gas before contacting it with the oxidizing solution, and a solution comprising formic acid.

According to another aspect of the invention, there is provided a process for reducing the formaldehyde content of a gas comprising formaldehyde and impurities. The process comprises:
 a) reducing the amount impurities present in the gas; and
 b) contacting the gas with an aqueous oxidizing solution comprising at least one cation, a base, and $H_2O_2$, so as to oxidize at least a part of the formaldehyde contained in the gas into formic acid and obtain a solution comprising formic acid, thereby reducing the formaldehyde content of the gas.

According to another aspect of the invention, there is provided a process for reducing the formaldehyde concentration of a gas generated during the manufacture of wood-based panel products comprising a formaldehyde-containing resin. The process comprises:
 a) recovering the gas;
 b) contacting the gas with an aqueous alkaline solution so as to at least partially remove impurities present in the gas;
 c) contacting the gas obtained in step (b) with an aqueous oxidizing solution comprising at least one cation, a base, a sequestering agent and $H_2O_2$, so as to oxidize at least a part of the formaldehyde contained in the gas into formic acid and obtaining a solution comprising formic acid, thereby reducing at least 30% of the formaldehyde content of the gas without requiring more than a ratio of 5:1 of $H_2O_2$: formaldehyde.

It was found that the processes of the present invention permit to reduce the formaldehyde content of a gas in a simple manner. Such processes can be operated at low costs and they do not require a costly and tedious maintenance of the systems used for carrying them out. It was also observed that such processes do not generate considerable amounts of smog precursors. In fact, such processes permit to minimize generation of smog precursors. It was also found that these processes can reduce the formaldehyde content of a gas by requiring a relatively small amount of oxidizer such as $H_2O_2$. Such a low consumption of $H_2O_2$ during these processes can explain why these processes can be carried out at low costs. An interesting fact is that the low $H_2O_2$ consumption can still be observed when treating gases containing formaldehyde as well as other oxidizable organic products. Such a low consumption of $H_2O_2$ can particularly be observed when impurities present in the gas are preferably at least partly removed therefrom, prior to oxidize the formaldehyde.

According to another aspect of the invention, there is provided an aqueous oxidizing solution comprising at least one cation, a base, and $H_2O_2$, wherein the solution is effective for oxidizing formaldehyde into formic acid.

It was found that such a solution is very effective for reducing the formaldehyde content of a gas by converting it into formic acid. Such a solution can be prepared at low costs and represent a simple manner to reduce the amount of formaldehyde in a gas. It also permits to reduce the formaldehyde content of the gas without generating considerable amounts of smog precursors (such as NOx, SOx etc.) or green house effect gases. In fact, it permits to minimize generation of smog precursors and green house effect gases. Such a solution can also contain a sequestering agent.

The term "impurities" as used herein when referring to a constituent of a gas relates to impurities, present in the gas, such as particulate material (preferably wood particles), condensable organic compounds derived from wood (such as fatty acids, terpenes etc.), or other compounds used in the wood-based panel industry (such as mineral oil, paraffin etc.).

The expression "sequestering agent" as used herein includes chemical moieties that bind to, or complex with, any cation or anion. Examples of sequestering agents or chelators are well known in the art. Preferably, the sequestering agent binds a metal cation.

The expression "packed column" as used herein refers to an absorption tower, in which the packing is used so as to increase contacts between a gas and a liquid. Preferably, such a packed column is used for removing a contaminant (such as formaldehyde) from a gas stream by absorbing it or dissolving it into a liquid (such as an oxidizing solution).

In the processes and the solution of the present invention the cation can be selected from the group consisting of $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof. Preferably, the cation is $Ca^{2+}$, $Mg^{2+}$, $Fe^{2+}$, or $Cu^{2+}$. $Fe^{2+}$ is a particularly preferred cation. The solution can have a concentration of the cation of at least 0.5 ppm. A concentration of about 0.5 ppm to about 250 ppm is preferred and of about 1 ppm to about 50 ppm is particularly preferred. The base can be selected from the group consisting of NaOH, KOH, $Mg(OH)_2$, $Ca(OH)_2$, $NaHCO_3$, $Na_2CO_3$, $K_2CO_3$, $KHCO_3$, and mixtures thereof. Preferably, the base is NaOH or KOH. NaOH is particularly preferred. $H_2O_2$ is preferably present at a concentration of at least 10 ppm. The concentration of $H_2O_2$ can be about 10 ppm to about 2500 ppm. More preferably, the concentration of $H_2O_2$ is about 20 ppm to about 1500 ppm. The solution is preferably a basic solution. The solution preferably has a pH of at least 9.0. The pH can be of about 9.3 to about 11.5 and preferably of about 9.5 to about 10.5, and more preferably of about 9.7 to about 10.0.

In the processes and the solution of the present invention, the aqueous oxidizing solution can further comprises a sequestering agent (or chelator). The sequestering agent (or chelator) can be selected from the group consisting of diethylenetriaminepentaacetic acid (DTPA), nitrolotriacetic acid (NTA), ethylenediaminetetraacetic acid (EDTA), sodium hexametaphosphate, sodium citrate, and mixtures thereof. The sequestering agent is preferably DTPA or NTA, and more preferably NTA. Alternatively, the sequestering agent can be an ion exchange resin such as zeolites. The sequestering agent is preferably present at a concentration of at least 1 ppm. The concentration can be of about 2 ppm to about 2500 ppm. More preferably, the concentration is about 4 ppm to about 1500 ppm.

In accordance with a preferred embodiment of the invention, the sequestering agent is NTA and the cation is $Fe^{2+}$.

In accordance with another preferred embodiment of the invention, the sequestering agent is NTA, the cation is $Fe^{2+}$ and the base is NaOH.

In accordance with another preferred embodiment of the invention, the sequestering agent is DTPA, and the cations are $Ca^{2+}$ and $Mg^{2+}$.

In accordance with another preferred embodiment of the invention, the sequestering agent is DTPA, the cations are $Ca^{2+}$ and $Mg^{2+}$ and the base is NaOH.

In the processes and solution of the present invention, the molar ratio $H_2O_2/CH_2O$ is preferably at least 1.0. The molar ratio $H_2O_2/CH_2O$ can be about 1.0 to about 10.0, preferably about 1.0 to about 5.0, more preferably about 1.0 to about 2.5 and even more preferably 1.1 to about 1.8. A molar ratio of about 1.1 to about 1.6 is particularly preferred.

In the processes of the present invention, the step of contacting the gas and the solution preferably includes mixing formaldehyde with the oxidizing solution so as to dissolve formaldehyde therein. Such a step preferably includes favorizing or enhancing absorption of the formaldehyde into the oxidizing solution. The gas and the oxidizing solution can be mixed together in a packed column. Preferably, the gas is introduced at a bottom portion of the column and the solution is introduced at a top portion, the gas and the solution being mixed together into the column over a predetermined amount of theoretical plates or transfer units. The person skilled in the art would understand that the amount of theoretical plates or transfer units will vary as a function of several parameters such as dimensions of the column, type of packing, flow rates of gas and solution, desired conversion of formaldehyde into formic acid, etc. The person skilled in the art would also understand that by increasing the amount of theoretical plates or transfer units in the column, the absorption or dissolution of formaldehyde into the solution will be enhanced, thereby increasing the reduction of formaldehyde into the gas or the formaldehyde oxidation rate. The person skilled in the art would also understand that the amount of theoretical plates or transfer units will vary as a function of the initial concentration of formaldehyde in the gas to be treated as well as the desired reduction rate of formaldehyde to achieve for that particular gas.

In the processes of the present invention, the gas, before contacting the solution, can be at a temperature of about 10° C. to about 85° C., preferably at about 15° C. to about 80° C., and more preferably at about 20° C. to about 65° C. During the processes, the temperature of the oxidizing solution can be about 15 to about 80° C. Preferably, the temperature is about 20 to about 70° C., and more preferably about 25 to about 60° C. The processes of the present invention can permit to reduce at least about 30%, preferably at least about 50%, more preferably at least about 75%, even more preferably at least about 85%, and still even more preferably at least about 90% of the formaldehyde content of the gas. An amount at least about 95% is particularly preferred. Alternatively, it can reduce about 90% to about 95% of the formaldehyde content of the gas.

In accordance with another preferred embodiment of the present invention, the gas, in the processes of the invention, is recovered or caught and then, it is treated so as to reduce the amount of impurities present therein.

When the processes of the present invention are used so as to treat gases comprising, in addition to formaldehyde, some impurities the step of at least partially removing them from the gas or reducing their amount from the gas can be carried out by contacting the gas with an aqueous alkaline solution. Preferably, such a step is carried out by
i) contacting the gas with an aqueous alkaline solution so as to obtain a mixture comprising the gas, the aqueous alkaline solution and the impurities, and
ii) separating the gas from the rest of the mixture.

Step (ii) can be carried out by means of three-phase-separator such as a cyclonic separator or a wet electrostatic precipitator.

The alkaline solution preferably comprises water and a base selected from the group consisting of NaOH, KOH, $Mg(OH)_2$, $Ca(OH)_2$, $Na_2CO_3$, $NaHCO_3$, $K_2CO_3$, $KHCO_3$, and mixtures thereof. Preferably, the base is NaOH or KOH. More preferably, the base is NaOH.

The processes and the solution of the present invention are preferably used for reducing the formaldehyde content of a gas generated in the manufacture of an article comprising a formaldehyde-containing resin. They can also be used for reducing the formaldehyde content of a gas generated in the wood board industry or a gas generated during the manufacture of wood-based panel products (preferably fiberboards or oriented strandboards). These processes are also useful for treating gases comprising formaldehyde, which are generated in foundries, smelters, petrochemical industries, sugar industries, dental care products industries, polymer industries, pulp and paper industries, automotive industries, paint industries, glassware industries, mineral wool industries.

In accordance with a preferred embodiment of the present invention, there is provided in a method for manufacturing wood-based panel products comprising mixing wood particles with a formaldehyde-containing resin, pressing the obtained mixture so as to obtain the wood-based panel products and treating a formaldehyde-containing gas released during the mixing and/or pressing step, the improvement wherein the formaldehyde-containing gas is treated by a process as defined in the present invention.

In accordance with a preferred embodiment of the present invention, there is provided in a method for manufacturing wood-based panel products comprising mixing wood particles with a formaldehyde-containing resin, pressing the obtained mixture so as to obtain the wood-based panel products and treating a formaldehyde-containing gas released during the mixing and/or pressing step, the improvement wherein the formaldehyde-containing gas is treated by a contacting it with a solution as defined in the present invention.

In accordance with another aspect of the present invention there is provided the use of NTA as a sequestering agent in an oxidizing solution. Preferably, such a solution is a basic solution. Preferably, such an oxidizing solution comprises $H_2O_2$, $Fe^{2+}$, and a base. The base is preferably NaOH. The preferred embodiments to the solution of the present invention are also applicable in such a use.

In accordance with another aspect of the present invention there is provided the use of DTPA as a sequestering agent in an oxidizing solution. Preferably, such a solution is a basic solution. Preferably, such an oxidizing solution comprises $H_2O_2$, $Ca^{2+}$, $Mg^{2+}$, and a base. The base is preferably NaOH. The preferred embodiments to the solution of the present invention are also applicable in such a use.

In accordance with an other aspect of the present invention there is provided a method for oxidizing formaldehyde into formic acid. The method comprises the step of contacting formaldehyde with an oxidizing solution comprising NTA, a base, a cation and $H_2O_2$. The cation is preferably $Fe^{2+}$. When applicable, all the preferred parameters previously mentioned concerning the processes and the solution of the present invention can also be used in the present method.

In accordance with an other aspect of the present invention there is provided a method for oxidizing formaldehyde into formic acid. The method comprises the step of contacting formaldehyde with an oxidizing solution comprising DTPA, a base, a cation and $H_2O_2$. The cation is preferably a mixture of $Ca^{2+}$ and $Mg^{2+}$. When applicable, all the preferred parameters previously mentioned concerning the processes and the solution of the present invention can also be used in the present method.

BRIEF DESCRIPTION OF DRAWINGS

In the following drawings, which represent by way of example only, preferred embodiments of the invention.

DETAILED DESCRIPTION OF PREFERRED EMBODIMENTS

Figure 1:
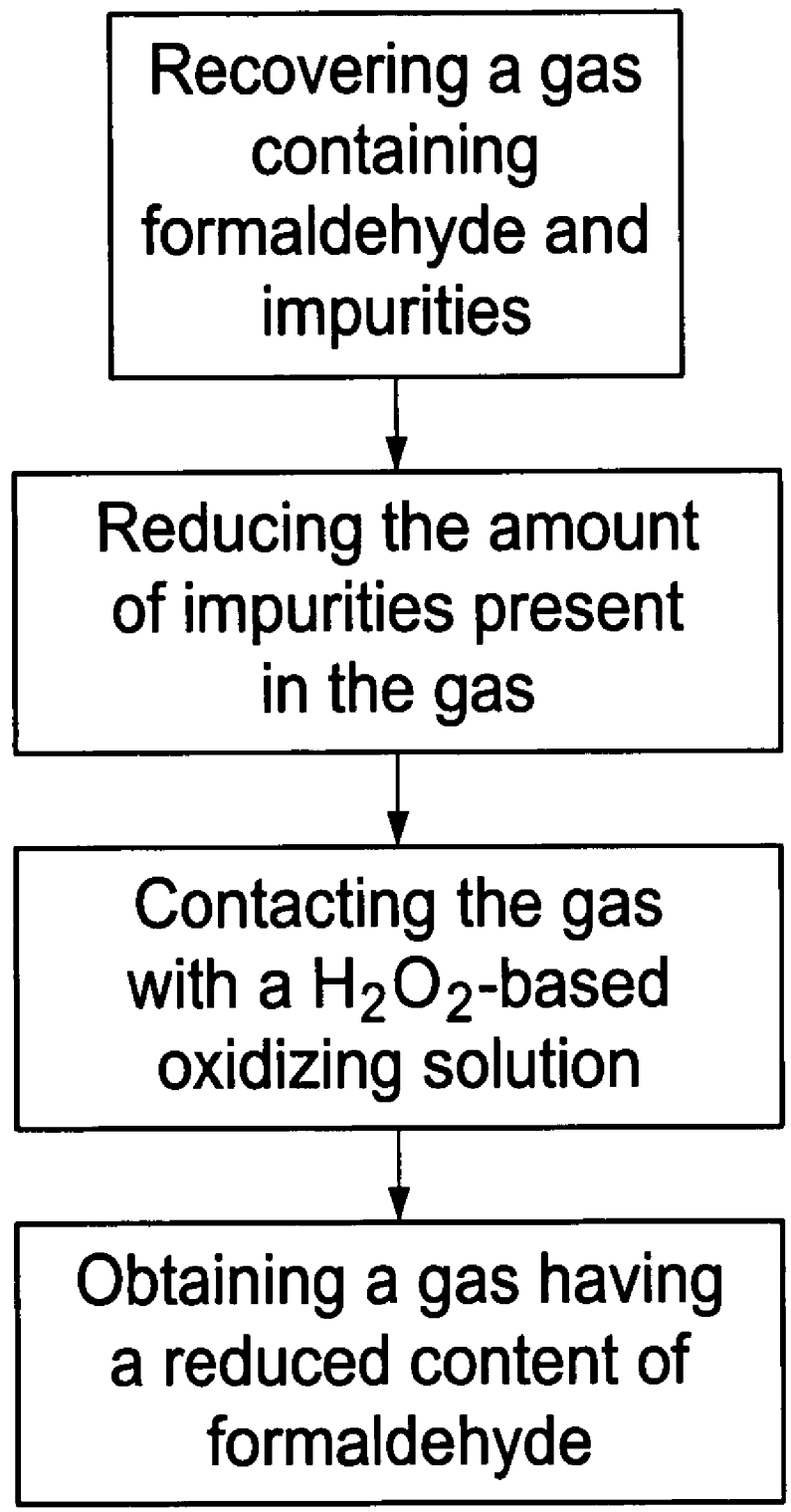
FIG. 1 shows a bloc diagram of a process according to a preferred embodiment of the present invention.

Further features and advantages of the invention will become more readily apparent from the following description of preferred embodiments as illustrated by way of examples only in the appended drawings wherein:

As it can be seen from FIG. 1, such a process is relatively simple and it can be carried out easily without requiring tedious tasks. When the formaldehyde-containing gas to be treated also contains impurities, such as particulate material (preferably wood particles), and/or condensable organic compounds, it is preferable to remove the impurities. After such a primary treatment, the gas is contacted with an oxidizing solution comprising $H_2O_2$. This treatment permits to oxidize the formaldehyde into formic acid, thereby reducing the amount of formaldehyde present in the gas.

Figure 2:
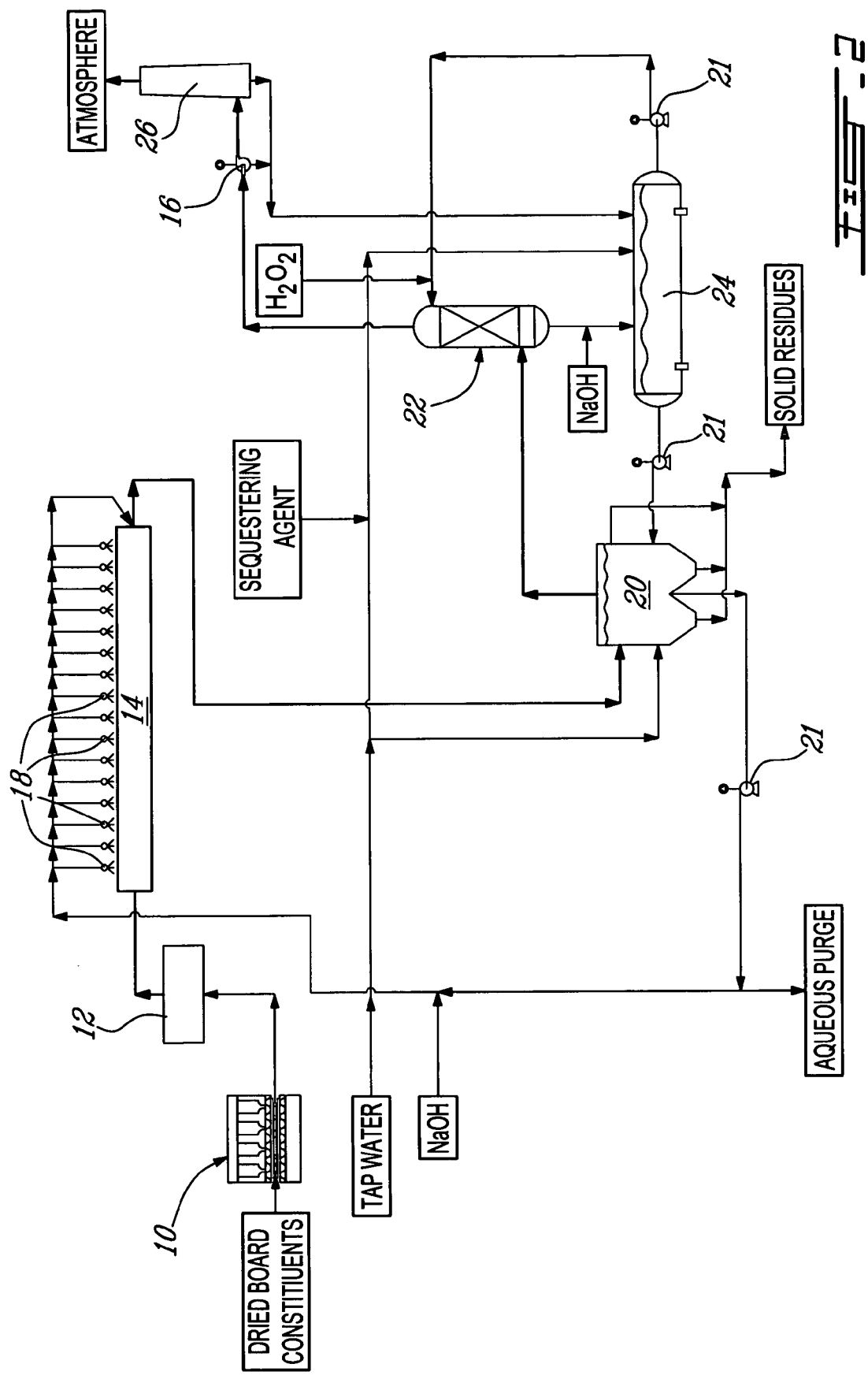
FIG. 2 is a schematic representation illustrating how is carried out a process according to another preferred embodiment of the present invention, when used in the manufacture of wood-based panels.

As shown in FIG. 2, in order to produce a board or panel, board constituents comprising wood fibers mixed together with a formaldehyde-containing resin and paraffin are introduced at the inlet of a press (10) so as to form a mat, which will be pressed in order to obtain a board. Such board constituents are preferably previously treated in a dryer.

Such a pre-treatment is particularly useful for reducing the amount of water present in the fibers. During the pressing step, a gas is released from the mat. Such a gas contains formaldehyde and can also contain various impurities such as wood particles and condensable organic compounds (other than formaldehyde). The gas and the surrounding air are captured by a hood (12), which is connected to a duct (14). The gas and surrounding air are drawn and circulated by means of an air flow rate generated by a fan (16) through the whole process. To avoid fouling inside the duct (14), an alkaline aqueous solution is spayed therein by means of a plurality of spray nozzles (18). Such a sprayed solution permits to saturate the gas with water and at the same time, decrease its temperature.

When the gas to be treated contains impurities a mixture comprising a solid phase, a liquid phase and a gaseous phase is generally obtained in the duct. The person skilled in the art would clearly recognize that one or several ducts can be used in such a process and that for each duct, in accordance to several parameters (such as dimensions of the duct, gas flow rate, concentration of formaldehyde etc.) the amount of spray nozzles (18) can vary.

After having been treated with the alkaline solution in the duct (14), the gas is further treated before oxidizing formaldehyde contained therein. In fact, the so-obtained mixture is treated via a wet scrubber or three-phase-separator (20), so as to individually separate each phase. Therefore, a considerable amount of the impurities is removed from the gas. The solid and liquid residues generated at this stage are cumulated with other solid residues and liquid residues (aqueous purge) generated during the process and eventually managed in an appropriate manner. The liquid residues or liquid phase so-obtained can also be recirculated upstream in the process via a pump (21), thereby feeding the spray nozzles (18). If necessary, during the process, certain quantities of NaOH can be added to the liquid residues provided to the spray nozzles (18).

The gas, for which a considerable amount of the impurities is efficiently removed, goes then into a packed column or absorption tower (22). In the tower (22), the gas and an aqueous oxidizing solution, previously prepared in a tank (24), are contacted together so as to enhance dissolution of formaldehyde in the oxidizing solution and therefore its oxidation rate into formic acid.

The solution is firstly prepared in the tank (24) by adding and mixing therein tap water (or alternatively treated water), a base (preferably NaOH) and a preferably sequestering agent. The solution is brought to an upper part of tower (22) by means of a pump (21). Before the solution reaches the tower (22), an oxidizing agent, $H_2O_2$ is added to the solution. Thus, the so-obtained solution reacts, in the tower (22), with formaldehyde of the gas as previously defined. The pH in the tank is preferably maintained at a pH of about 9.5 to 10.5. The solution is thus continuously recirculated into the tower (22). To avoid the build-up of reaction products like sodium formate after a certain time, a part of the oxidizing solution can be purged towards the three-phase-separator (20) and then towards the aqueous purge by means of pumps (21). To replace such an amount of purged oxidizing solution, some more tap water (or treated water), NaOH, and preferably a sequestering agent are added to the tank (24). Some more $H_2O_2$ is also added.

The person skilled in the art would clearly understand that depending on the location or city where the process is carried out, the composition of the tap water will vary. In fact, under certain circumstances, tap water as is i.e. without further treatment by adding 0 or removing a cation or a mixture of cations will be sufficient for the oxidizing treatment. However, in other cases, the tap water will have to be treated by adding or removing one or several type of cations. In fact, the tap water is usually firstly analyzed so as to determine its content in cations. Depending on this analysis, a further treatment i.e. addition or removal of cations will be required so as to obtain better conditions for the reaction. In such a case, a cation as those previously described in the present invention will be added or removed from to the tap water, and it will be said that a treated water is used instead of a tap water. The amount of cation present in the solution and useful in the oxidation reaction can be about 0.5 to about 250 ppm. The person skilled in the art would also understand that in the present invention when referring to "a cation" it is meant a type of cation as those previously described. It is clearly not meant a single charged atom (single cation).

It also has to be noted that the use of a sequestering agent is preferable for obtaining optimal results. In fact, in the processes of the present invention, it was observed that the use of a sequestering agent permits to obtain a better control and a better stability of the oxidation reaction. In particular, the use of a sequestering agent permits to keep the $H_2O_2/CH_2O$ molar ratio as low as possible. It also permits to have a good control on the kinetic of the reaction. It was observed in the processes of the present invention that NTA and DTPA were particularly efficient sequestering agents. In accordance with one preferred embodiment $Fe^{2+}$ is used together with NTA as sequestering agent. In accordance with another preferred embodiment, DTPA was found to be very efficient when used in the presence of $Ca^{2+}$ and $Mg^{2+}$.

The gas treated as previously described, then leaves the absorption tower (22) so as to go to a chimney (26) by means of the fan (16). The person skilled in the art would then recognize that the dimensions of the chimney used will vary in accordance with the amount of pollutant (formaldehyde) released in the atmosphere as well as the environmental requirements, or laws or standards at the location where the process is carried out. An efficient reduction of the formaldehyde content of the gas as provided by the processes of the present invention would then simplify such a task.

Since air leaving from the chimney (26) is saturated with water, condensation can occur. In this case, condensed water is returned to the reaction tank (24).

The aqueous purge containing sodium formate can be managed in the plant in different ways. As example, the purge can be used so as to humidify the dust coming from panel sanding for combustion in a boiler. The solid residues can also be preferably disposed in various environmental manners. Since these residues have a calorific value, they can also be valorized in the boiler.

Figure 3:
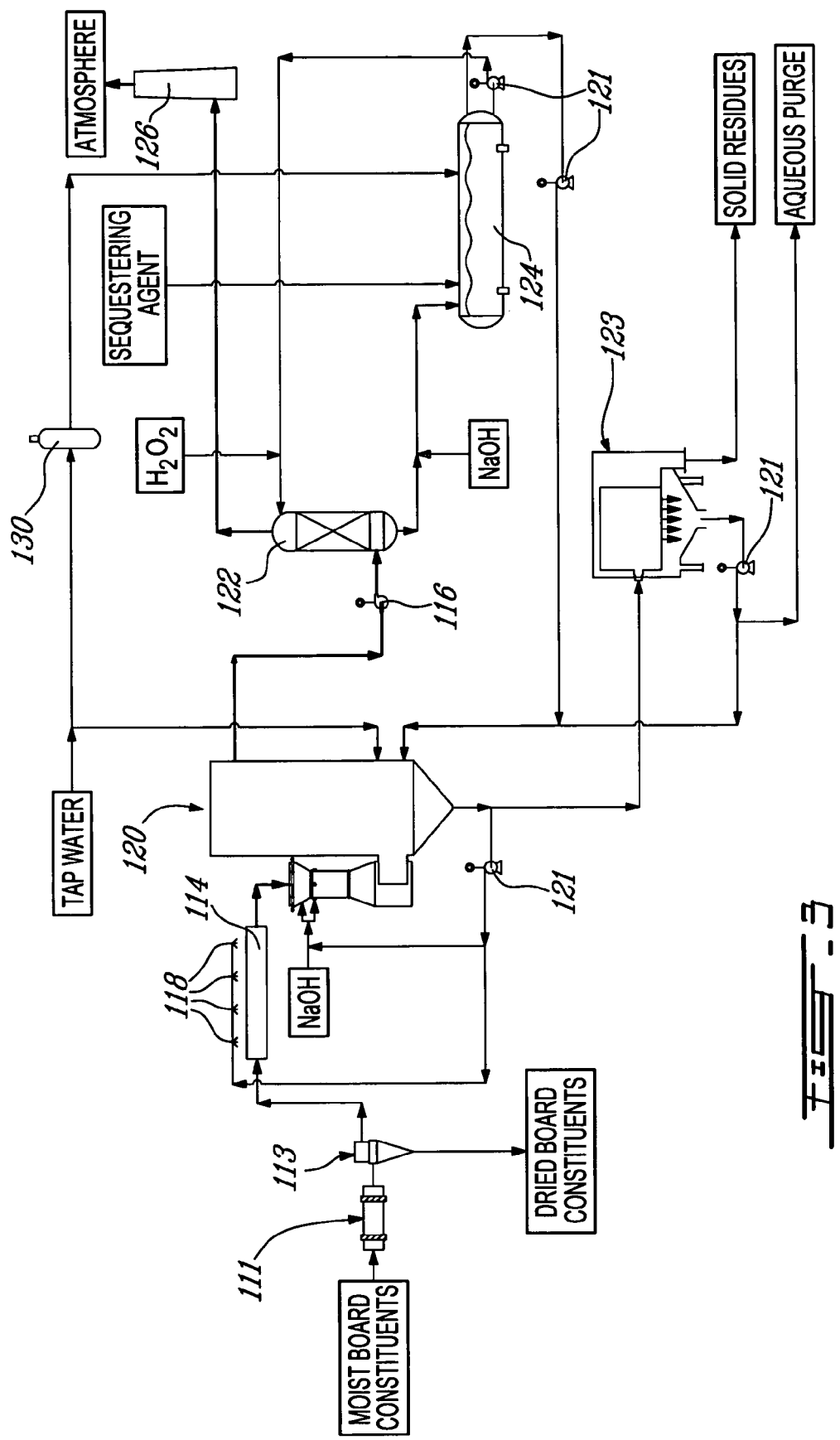
FIG. 3 is a schematic representation illustrating how is carried out a process according to still another preferred embodiment of the present invention, when used in the manufacture of wood-based panels.

As it can be seen from FIG. 3, such a process is similar to the one illustrated in FIG. 2. However, in the case of the process shown in FIG. 3, the gas is captured from a dryer used in the wood-based panel industry. In fact, in the process of FIG. 3, moist board constituents (such as a moist mixture comprising wood fibers, a formaldehyde-containing resin, and paraffin) are heated in a dryer (111) so as to remove water therefrom and to obtain dried board constituents. Such dried constitutents can then be used in the manufacture of a panel, in a press, as shown in FIG. 2. When heated in the dryer, the mixture of the board constituents, releases a gas containing formaldehyde and other impurities such as particulate material (preferably wood particles), and/or condensable organic compounds. The gas is thus captured in the dryer (111) and then drawn and circulated by means of an air flow generated by a fan (116), through the whole process. The gas then passes through a cyclonic separator (113) so as to remove and recuperate dried board constituents contained therein. The gas is collected by a duct (114) provided with a plurality of spray nozzles (118). To avoid fouling inside the duct (114), an alkaline aqueous solution is spayed therein by means of the nozzles (118). Such a sprayed solution permits to saturate the gas with water and at the same time, decrease its temperature. Since the gas is hot and saturated, water condensation is favorized. A mixture comprising a solid phase, a liquid phase and a gaseous phase is generally obtained in the duct (114).

After having been treated with the alkaline solution, the gas is further treated before oxidizing formaldehyde contained therein. In fact, the so-obtained mixture is treated via a wet scrubber or three-phase-separator (120), so as to individually separate each phase. Therefore, a considerable amount of the remaining impurities is removed from said gas. The solid phase is then treated by means of a rotary filter (123), and the liquid phase can be recirculated, by means of a pump (121), into the spray nozzles (118) or in the three-phase-separator (120). When the liquid phase is recirculated in the separator (120) some more NaOH can be added thereto. After the treatment of the solid phase in the rotary filter (123), solid residues and an aqueous purge are obtained. These residues and the purge can be combined with the other similar waste products generated during the whole process. The aqueous portion obtained from the filter (123) can be further recirculated in the separator (120).

The gas, for which a considerable amount of impurities is efficiently removed, goes then to a packed column or absorption tower (122) via the action of the fan (116). In the tower (122), the gas and an aqueous oxidizing solution, previously prepared in a tank (124), are contacted together so as to enhance dissolution of formaldehyde in the oxidizing solution and therefore its oxidation rate into formic acid.

Prior to contact the gas in the tower, the solution was previously prepared in the tank (124) by adding and mixing therein tap water (or alternatively treated water), a base (preferably NaOH) and a preferably sequestering agent. As previously discussed the choice of using tap water or treated water will vary in accordance of the constituents (cation(s)) present in the tap water. Such parameters may also influence the use or not of the sequestering agent and possibly its nature. If tap water needs to be treated, it passes through a water treating device (130), which is optionally present. Such a device can be present in the plant, an if required the tap water passes therethrought to be treated. If not required, the tap water simply by-pass it. The treatment device (130) can be used for softening water, adding some cation(s) etc. Such a device can be a column for softening water. In such a device the $Ca^{2+}$ present in water is at least partially replace by $Na^+$, so as to obtain a soft water. Alternatively, such a device can be a mixing vessel in which one or more type of cations are added and mixed with tap water. The device (130) can also be a combination of such a column and vessel. The device (130) can be useful since for a same tap water coming from a particular location, important variations of the concentration of ions can be observed through a same year or a same month.

After being prepared in the tank (124), the solution is brought to an upper part of tower (122) by means of a pump (121). Before the solution reaches the tower (122), an oxidizing agent, $H_2O_2$, is added in the solution. Thus, the so-obtained solution reacts, in the tower, with formaldehyde of the gas as previously defined. The pH in the tank is preferably maintained at a pH of about 9.5 to 10.5. The solution is thus continuously recirculated into the tower (122).

Similarly to what has been described for FIG. 2, after a predetermined time, a portion of the oxidizing solution in the tank (124) is preferably purged towards the aqueous purge or towards the separator (120) by means of a pump (121). Therefore, in order to replace such an amount of purged oxidizing solution, some more tap water (or treated water), NaOH, and preferably sequestering agent are added to the tank (124). Some more $H_2O_2$ is also added.

Finally, the gas then leaves the absorption tower (122) so as to go to a chimney (126) by use of the fan (116). The dimensions of such a chimney will vary as previously described.

The processes shown in FIGS. 1 to 3 can be used for treating formaldehyde-containing gases generated in a plurality of other industries as previously defined.

The following non-limiting examples further illustrate the invention.

EXAMPLES

Example 1

Reducing the Formaldehyde Content of a Gas Stream Coming from a Particle Board Press This process defined in Example 1 was carried out using a system similar to the system schematically represented in FIG. 2.

This process was used to treat an air flow of 79 000 $Nm^3/h$ having a concentration of formaldehyde of 38 $mg/Nm^3$. Two absorption towers and two reaction tanks at a temperature of 30° C. were used. The absorption towers had about 7 transfer units. Several tests were performed with such a system so as to optimize the various parameters of that particular process.

In the various tests, the base used was NaOH at a pH of about 9.5 to about 10.5 and optimal results have been observed for pH of about 9.7 to about 10.0. A sequestering agent, DTPA, was added to tap water to obtain a concentration of about 1200 ppm to about 2000 ppm in the oxidizing solution and preferably of about 1600 ppm. The tap water as is, was already comprising $Ca^{2+}$ and $Mg^{2+}$ ions in a sufficient quantity, so that no further treatment of the tap water was required. During the several tests carried out, the average concentration of $Ca^{2+}$ was about 90 to about 110 ppm, and the average concentration of $Mg^{2+}$ was about 15 to about 25 ppm.

The tank had a residence time sufficiently long (preferably about 20 minutes) to obtain a good reaction conversion of formaldehyde into formic acid in its salt form (sodium salt). $H_2O_2$, was added, as shown on FIG. 2 so as to obtain a residual concentration of $H_2O_2$ at the outlet of the reaction tank of approximately 1200 to 2000 ppm and preferably 1800 ppm.

Such tests permitted a formaldehyde removal as high as 97.3% based on the emission of formaldehyde at the press. Moreover, during these tests, it was possible to maintain the molar ratio $H_2O_2/CH_2O$ below 2.0 and even at about 1.7.

Example 2

Reducing the Formaldehyde Content of a Gas Stream Coming from a MDF/HDF Board Dryer Several tests were made on a pilot scale system, which is similar to the system schematically represented on FIG. 3. A gas having an air flow rate of 2000 $Nm^3/h$ and having a concentration of 20 $mg/Nm^3$ in formaldehyde at a temperature of 48° C. was treated. The base used was NaOH at various pH between 9.5 to and 10.5 and preferably at 9.8. A sequestering agent, NTA, was added to tap water to obtain a concentration of about 4 ppm to about 20 ppm in the oxidizing solution. The tap water was treated by adding thereto $Fe^{2+}$ ions at a concentration of about 1 to about 5 ppm.

The tank had a residence time sufficiently long (preferably about 20 minutes) to obtain a good reaction conversion of formaldehyde into formic acid in its salt form (sodium salt). $H_2O_2$, was added, as shown on FIG. 3 so as to obtain a residual concentration of $H_2O_2$ at the outlet of the reaction tank of approximately 10 ppm to 75 ppm and preferably about 10 ppm. The absorption tower had about 2.4 transfer.

Such tests permitted a formaldehyde removal as high as 77.0% based on the emission of formaldehyde at the dryer. Moreover, during these tests, it was possible to maintain the molar ratio $H_2O_2/CH_2O$ below 2.0 and even at about 1.6.

These examples clearly demonstrate that the processes, the solution and the method of the present invention permit to efficiently and simply reduce the formaldehyde content of a gas. The processes of the present invention can be carried out at low costs and without requiring tedious or complicated tasks. It was shown that in these basic pH conditions, as defined in examples 1 and 2, an efficient conversion of formaldehyde into formic acid was observed and that no $CO_2$ was generated from such an oxidation process. It was also found that when preferably carried out at a pH of 9.5 to 10.5, very interesting results were obtained. In these examples, high reductions of the formaldehyde content of the treated gases was observed, while maintaining the molar ratio $H_2O_2/CH_2O$ substantially low.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for reducing formaldehyde content of a gas, comprising the step of contacting said gas with a basic aqueous oxidizing solution comprising $H_2O_2$ and at least one metal cation chosen from $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof, so as to oxidize at least a part of said formaldehyde contained in said gas into formic acid, thereby obtaining a gas having a reduced content in formaldehyde as compared to said gas before contacting it with said oxidizing solution, and a solution comprising formic acid.

2. The process of claim 1, wherein said basic aqueous oxidizing solution comprises a base selected from the group consisting of NaOH, KOH, $Mg(OH)_2$, $Ca(OH)_2$, $NaHCO_3$, $Na_2CO_3$, $K_2CO_3$, $KHCO_3$, and mixtures thereof.

3. The process of claim 1, wherein said basic aqueous oxidizing solution comprises NaOH.

4. The process of claim 1, wherein said basic aqueous oxidizing solution further comprises a sequestering agent.

5. The process of claim 4, wherein said sequestering agent is selected from the group consisting of diethylenetriaminepentaacetic acid (DTPA), nitrolotriacetic acid (NTA), ethylenediaminetetraacetic acid (EDTA), sodium hexametaphosphate, sodium citrate, and mixtures thereof.

6. The process of claim 5, wherein said sequestering agent is NTA and said basic aqueous oxidizing solution comprises $Fe^{2+}$.

7. The process of claim 6, wherein said basic aqueous oxidizing solution comprises NaOH.

8. The process of claim 5, wherein said sequestering agent is DTPA and said basic aqueous oxidizing solution comprises $Ca^{2+}$ and $Mg^{2+}$.

9. The process of claim 1, wherein said basic aqueous oxidizing solution comprises $Fe^{2+}$, $Ca^{2+}$, $Mg^{2+}$, or mixtures thereof at a concentration of about 0.5 ppm to about 250 ppm.

10. The process of claim 1, wherein said basic aqueous oxidizing solution has a concentration of $H_2O_2$ of about 10 ppm to about 2500 ppm.

11. The process of claim 4, wherein said basic aqueous oxidizing solution has a concentration of said sequestering agent of about 2 ppm to about 2500 ppm.

12. The process of claim 1, wherein said basic aqueous oxidizing solution has a pH of at least 9.0.

13. The process of claim 1, wherein said basic aqueous oxidizing solution has a pH of about 9.3 to about 11.5.

14. The process of claim 1, wherein the molar ratio $H_2O_2/CH_2O$ is about 1.0 to about 10.0.

15. The process of claim 1, wherein the molar ratio $H_2O_2/CH_2O$ is about 1.1 to about 1.8.

16. The process of claim 1, wherein said contacting includes mixing formaldehyde with said basic aqueous oxidizing solution so as to dissolve formaldehyde therein.

17. The process of claim 1, wherein said contacting includes favorizing or enhancing absorption of said formaldehyde into said basic aqueous oxidizing solution.

18. The process of claim 17, wherein said gas and said basic aqueous oxidizing solution are mixed together in a packed column.

19. The process of claim 1, wherein said process permits to reduce at least about 85% of the formaldehyde content of said gas.

20. A process for reducing the formaldehyde content of a gas comprising formaldehyde and impurities, said process comprising:
   a) reducing the amount impurities present in said gas; and
   b) contacting said gas with a basic aqueous oxidizing solution comprising $H_2O_2$ and at least one metal cation chosen from $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof, so as to oxidize at least a part of said formaldehyde contained in said gas into formic acid and obtain a solution comprising formic acid, thereby reducing the formaldehyde content of said gas.

21. The process of claim 20, wherein said impurities comprises wood particles and organic compounds derived from wood or wood constituents.

22. The process of claim 20, wherein step (a) is carried out by contacting said gas with an aqueous alkaline solution so as to reduce the amount of impurities in said gas.

23. The process of claim 22, wherein step (a) is carried out by:
   i) contacting said gas with the aqueous alkaline solution so as to obtain a mixture comprising said gas, said aqueous alkaline solution and said impurities, and
   ii) separating said gas from the rest of said mixture.

24. The process of claim 23, wherein said aqueous alkaline solution comprises a base selected from the group consisting of NaOH, KOH, $Mg(OH)_2$, $Ca(OH)_2$, $Na_2CO_3$, $NaHCO_3$, $K_2CO_3$, $KHCO_3$, and mixtures thereof.

25. In a method for manufacturing wood-based panel products comprising mixing wood particles with a formaldehyde-containing resin, pressing the obtained mixture so as to obtain said wood-based panel products and treating a formaldehyde-containing gas released during said mixing and/or pressing step, the improvement wherein said formaldehyde-containing gas is treated by a process as defined in claim 1.

26. A process for reducing the formaldehyde concentration of a gas generated during the manufacture of wood-based panel products comprising a formaldehyde-containing resin, said process comprising:
   a) recovering said gas;
   b) contacting said gas with an aqueous alkaline solution so as to at least partially remove impurities present in said gas;
   c) contacting the gas obtained in step. (b) with a basic aqueous oxidizing solution comprising at least one metal cation chosen from $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof, a sequestering agent and $H_2O_2$, so as to oxidize at least a part of said formaldehyde contained in said gas into formic acid and obtaining a solution comprising formic acid, thereby reducing at least 30% of the formaldehyde content of said gas without requiring more than a ratio of 5:1 of $H_2O_2$: formaldehyde.

27. The process of claim 26, wherein said wood-based panel products are fiberboards or oriented strandboards.

28. A basic aqueous oxidizing solution comprising $H_2O_2$, at least one metal cation, and a sequestering agent, wherein the solution is effective for oxidizing formaldehyde into formic acid.

29. The solution of claim 28, wherein the at least one metal cation is chosen from $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof.

30. The solution of claim 28, wherein the at least one metal cation is chosen from $Ca^{2+}$, $Mg^{2+}$, $Fe^{2+}$, and mixtures thereof.

31. The solution of claim 28, wherein said sequestering agent is selected from the group consisting of diethylenetriaminepentaacetic acid. (DTPA), nitrolotriacetic acid. (NTA), ethylenediaminetetraacetic acid. (EDTA), sodium hexametaphosphate, sodium citrate, and mixtures thereof.

32. The solution of claim 28, wherein said sequestering agent is nitrolotriacetic acid. (NTA) and said at least one metal cation is $Fe^{2+}$.

33. The solution of claim 28, wherein said basic aqueous oxidizing solution comprises $Ca^{2+}$ and $Mg^{2+}$ and wherein said sequestering agent is diethylenetriaminepentaacetic acid (DTPA).

34. The solution of claim 30, wherein said basic aqueous oxidizing solution has a concentration of $H_2O_2$ of about 10 ppm to about 2500 ppm.

35. The solution of claim 34, wherein said basic aqueous oxidizing solution has a concentration of said sequestering agent of about 2 ppm to about 2500 ppm.

36. The solution of claim 30, wherein said basic aqueous oxidizing solution has a pH of at least 9.0.

37. The solution of claim 35, wherein said basic aqueous oxidizing solution has a pH of about 9.3 to about 11.5.

38. A process for reducing formaldehyde content of a gas, comprising the step of contacting said gas with a basic aqueous oxidizing solution comprising $H_2O_2$ at least one metal cation, and a sequestering agent, so as to oxidize at least a part of said formaldehyde contained in said gas into formic acid, thereby obtaining a gas having a reduced content in formaldehyde as compared to said gas before contacting it with said oxidizing solution, and a solution comprising formic acid.

39. The process of claim 38, wherein the at least one metal cation is chosen from $Ca^{2+}$, $Mg^{2+}$, $Fe^{2+}$, $Cu^{2+}$, $Ni^{2+}$, $Mn^{2+}$, $Ti^{4+}$, $Cr^{3+}$, $Ce^{3+}$, $Zn^{2+}$, $Pd^{2+}$, $Mo^{6+}$, and mixtures thereof.

40. The process of claim 38, wherein the at least one metal cation is chosen from $Ca^{2+}$, $Mg^{2+}$, $Fe^{2+}$, and mixtures thereof.

41. The process of claim 38, wherein said sequestering agent is selected from the group consisting of diethylenetriaminepentaacetic acid (DTPA), nitrolotriacetic acid (NTA), ethylenediaminetetraacetic acid (EDTA), sodium hexametaphosphate, sodium citrate, and mixtures thereof.

42. The process of claim 38, wherein said sequestering agent is nitrolotriacetic acid (NTA) and said at least one metal cation is $Fe^{2+}$.

43. The process of claim 38, wherein said basic aqueous oxidizing solution comprises $Ca^{2+}$ and $Mg^{2+}$ and wherein said sequestering agent is diethylenetriaminepentaacetic acid (DTPA).

* * * * *